United States Patent [19]

Shiota

[11] Patent Number: 5,045,949

[45] Date of Patent: Sep. 3, 1991

[54] IMAGE RECORDING APPARATUS FOR RECORDING STILL IMAGE AND LETTERS WITHOUT DISTORTION

[75] Inventor: Kazuo Shiota, Tokyo, Japan

[73] Assignee: Fuji Photo Film Co., Ltd., Kanagawa, Japan

[21] Appl. No.: 230,603

[22] Filed: Aug. 10, 1988

[30] Foreign Application Priority Data

Aug. 18, 1987 [JP] Japan .................. 62-203526

[51] Int. Cl.$^5$ .............................................. H04N 5/84
[52] U.S. Cl. .................................... 358/244; 358/163; 355/20
[58] Field of Search ............... 358/244, 244.1, 244.2, 358/226, 163; 354/76, 79; 355/20; 346/110

[56] References Cited

U.S. PATENT DOCUMENTS

| | | | |
|---|---|---|---|
| 2,757,571 | 8/1956 | Loughran | 355/20 |
| 3,700,329 | 10/1972 | Mason | 355/20 |
| 4,191,962 | 3/1980 | Sramek | 354/76 |
| 4,231,061 | 10/1980 | Freeman | 358/244 |
| 4,278,347 | 7/1981 | Okamoto et al. | 358/244 |
| 4,516,845 | 5/1985 | Blakely et al. | 358/244 |
| 4,694,354 | 9/1987 | Tanaka et al. | 358/102 |
| 4,754,334 | 1/1988 | Kriz et al. | 358/244 |
| 4,772,962 | 9/1988 | Tanaka et al. | 360/10.1 |
| 4,831,436 | 5/1989 | Birgmeir et al. | 358/244 |
| 4,888,648 | 12/1989 | Takeuchi et al. | 358/906 |

*Primary Examiner*—Roy N. Envall, Jr.
*Assistant Examiner*—Huy Nguyen

[57] ABSTRACT

An image recording apparatus displays, together with information, an image represented by video signals read out from a video signal recording medium on a video display so as to project the displayed image and information onto an image recording medium. For the displayed image and the information displayed in the proximity of the image, light is interrupted in the vicinity of edges of areas of the image recording medium where the image and the information are projected. From the image projected onto the image recording medium, a printed picture thereof is attained in which the contour of the image is not distorted and the position thereof is fixed.

21 Claims, 4 Drawing Sheets

IMAGE RECORDING APPARATUS FOR RECORDING STILL IMAGE AND LETTERS WITHOUT DISTORTION

BACKGROUND OF THE INVENTION

1. Field of the Invention

The present invention relates to an image recording apparatus, and in particular, to an image recording apparatus in which a video signal representing a still picture is read out from a video signal recording medium so as to record a visualized image thereof on an image recording medium such as a sheet of printing paper.

2. Description of the Prior Art

Conventionally, there has been proposed a still image recording apparatus which receives a video signal read out from a video signal recording medium, for example, a video floppy disk, so as to reproduce a visualized image on an image recording medium such as a sheet of printing paper.

In such an apparatus, separated-color signals of red, R, green, G, and blue, B attained from the video signal read out from a video floppy disk, for example, are sequentially supplied to a recording monochromatic CRT with high brightness. In front of the display screen of the recording CRT, there are disposed a lens and a three-color separating filter such that an image displayed on the screen is projected and focused through the lens and the three-color separating filter so as to obtain a focused image on a sheet of color printing paper.

In the image recording apparatus, as described above, it is required to project the image read out from the video floppy disk and displayed on the screen of the recording CRT onto a sheet of color printing paper so as to record a color picture thereon; and to furthermore record a title, the date when the picture is shot, and other characters or letters on the same sheet.

Conventionally, in the case where such characters are to be recorded, for example, a signal representing the characters is inputted to the recording CRT together with the video signal such that when the still image is displayed on the screen of the CRT, the characters are also displayed in the neighborhood of the displayed still image; and then both of the image and the characters are projected onto a sheet of color printing paper, thereby attaining a color still image including the recorded characters. However, when the image displayed on the CRT screen is directly projected on the sheet of color printing paper, since the display position of the image obtained on the CRT screen varies depending on the thermal drift in the characteristics of the image processing circuit and the terrestrial or earth magnetic field, the location of the image displayed on the sheet of color printing paper cannot be fixed. Consequently, the image cannot be displayed at a fixed location on the sheet of color printing paper.

In addition, the contour of the image displayed on the screen of the CRT does not become a rectangular shape, namely, there is obtained a so-called barrel or spool shape. Consequently when the image is recorded on the sheet of color printing sheet, the contour of the picture is not arranged in parallel with that of the sheet of color printing paper and hence, printed picture quality is spoiled. There has been required a complex and burdensome adjustment of the CRT to remove the distortion of the contour thus appearing in the displayed image. Furthermore, straightness of the edges of the picture frame displayed on the CRT screen is insufficient, which leads to a problem that the printed picture frame does not have a smooth contour.

In order to prevent occurrences of the positional variation of the picture recorded on a sheet of color printing paper, the barrel-shaped or spoolshaped distortion of the contour of the picture, and the like, there has been employed a method in which a mechanical mask is used to shade the end portions of the periphery of the image when the image displayed on the CRT screen is projected onto the sheet of color printing paper. With this provision, regardless of the variation in position of the image displayed on the CRT, the picture can be recorded at a fixed position on the sheet of color printing paper. In addition, the occurrences of the barrel-shaped or spool-shaped distortion of the image and the like can be prevented, and consequently, the contour of the picture is arranged to be parallel to that of the sheet of color printing paper.

However, when the mechanical mask is adapted as described above, since light is interrupted on the edge portions of the periphery of the image projected onto the sheet of color printing paper, it is impossible to record letters such as of a date in the peripheral portion of the projected picture. In this situation, when letters are to be recorded, there is disposed an opening section in the mechanical mask in the neighborhood of the periphery of the image so as to arrange a lithographic film including a pattern of the letters to be recorded in the opening section, and the lithographic film is exposed to the light source so as to print the letters of the lithographic film on a sheet of color printing paper, thereby recording the letters thereon. Consequently, with this method, there has been a problem that letters other than those fixedly carried on the lithographic film cannot be printed on the sheet of color printing paper.

SUMMARY OF THE INVENTION

It is therefore an object of the present invention to provide an image recording apparatus eliminating the disadvantages of the prior art technology in which letters can be recorded on an image recording medium together with a still picture represented by a video signal read out from a video signal recording medium; moreover, the positional variation and the distortion can be removed from the picture recorded on the image recording medium.

According to the present invention, an image recording apparatus for projecting an image onto an image recording medium so as to record a visualized image thereof on the image recording medium includes video display means for displaying, together with information, an image associated with video signals read out from a video signal recording medium, projecting means for projecting the image and the information displayed by the video display means onto an image recording medium, and a light interrupting means for interrupting light from a portion of an image displayed by the video display means, wherein the video display means displays the information in the vicinity of the displayed image, and the light interrupting means effects a light interruption in the proximity of three edges of an area of the image recording medium where the image is projected.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The objects and features of the present invention will become more apparent from the consideration of the following detailed description taken in conjunction with the accompanying drawings in which.

FIG..3 schematically shows a portion of a conventional image recording apparatus and a printed example obtained by the conventional recording apparatus.

DESCRIPTION OF THE PREFERRED EMBODIMENT

Next, referring to the accompanying drawings, a description will be given in detail of an embodiment of an image recording apparatus according to the present invention.

Figure 1:
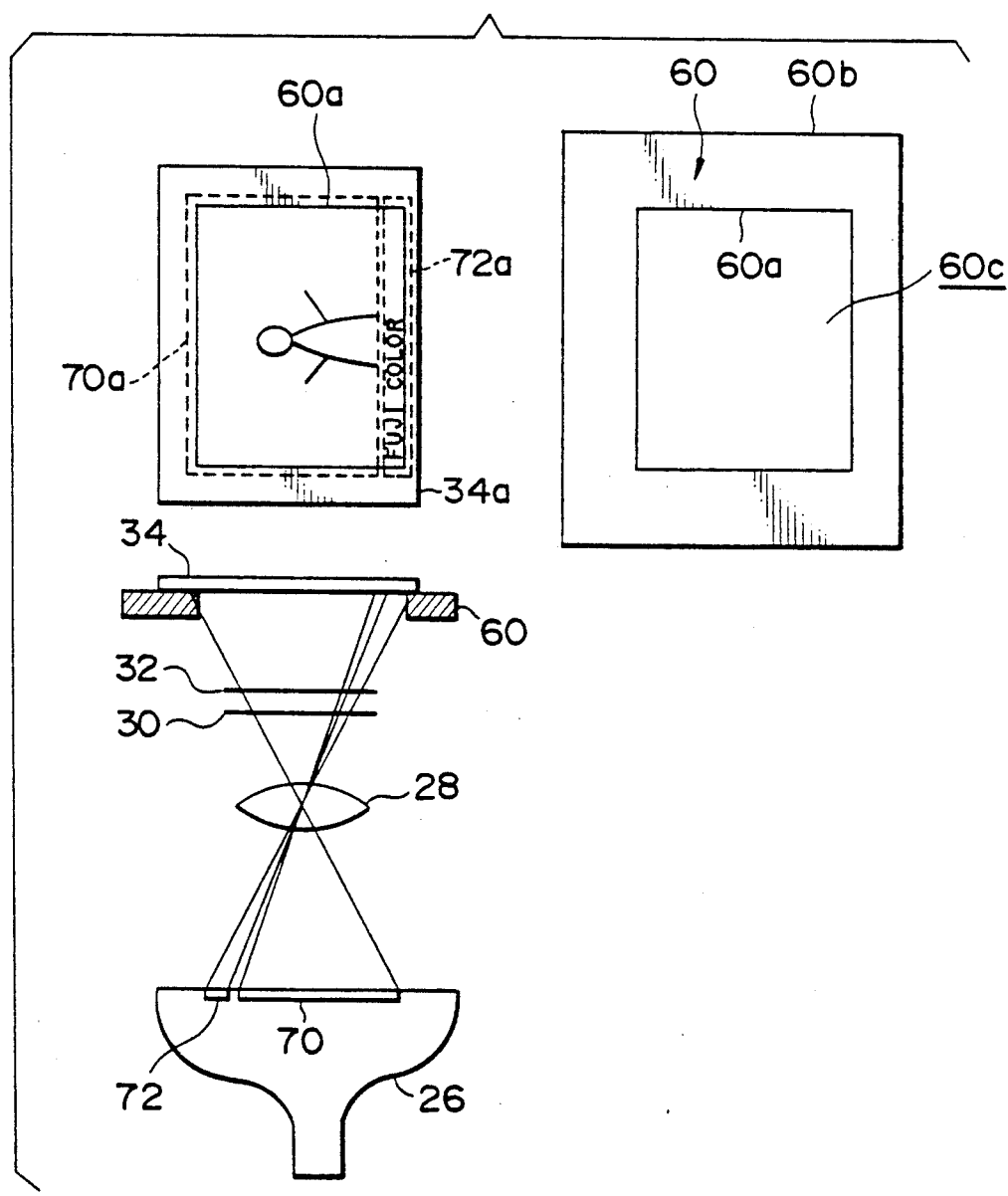
FIG. 1 schematically shows a portion of an embodiment of an image recording apparatus according to the present invention and a printed example obtained by the recording apparatus.
Figure 2:
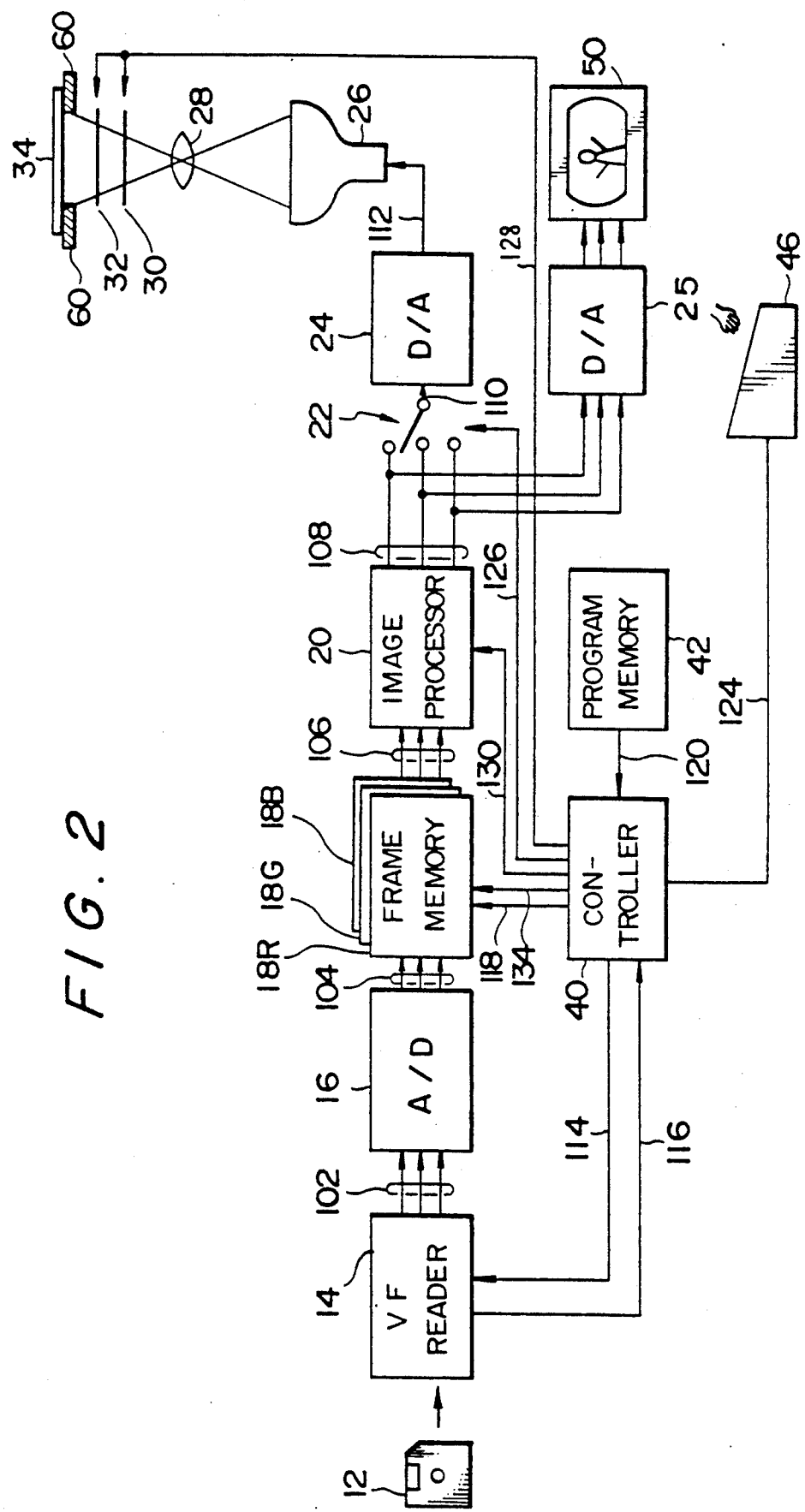
FIG. 2 is a block diagram schematically showing the overall constitution of the image recording apparatus according to the present invention.

FIG. 2 shows the overall configuration of the image recording apparatus according to the present invention, and FIG. 1 shows such primary sections of the recording apparatus of FIG. 2 as a recording monochromatic CRT 26 and a mechanical mask 60 and an example of a printed image 34a attained by means of this apparatus.

In the image recording apparatus, a video signal recorded on a video floppy disk 12 is read out therefrom so as to display an image represented by the video signal on the CRT 26. Then the displayed image is projected onto a sheet 34 of color printing paper to attain a printed picture, and characters associated with data read out from the video floppy disk 12 or predetermined characters read out from a program memory 42 are also displayed on the CRT so as to project the displayed characters onto the sheet 34 of color printing paper to obtain a printed image thereof. When the projection and exposure are effected of the image displayed on the CRT 26 to obtain a printed picture on the sheet 34 of color printing paper, a mechanical mask 60 of FIG. 1 is adapted, which will be described later in this specification, thereby arranging the contours in three directions of the image in the printed picture 34a.

First, an outline of the image recording apparatus will be described with reference to FIG. 2.

This apparatus includes a video floppy disk playback unit or reader 14 for reading out a video signal from the video floppy disk 12. The video floppy disk reader 14 specifies a track of the video floppy disk 12 with a control signal delivered on a signal line 114 from a controller 40, which will be described later, so as to read out a video signal from which a printed image is generated on the sheet 34 of color printing paper. The video floppy disk reader 14 delivers an output on signal lines 102 to an analog-to-digital, A/D converter 16.

The A/D converter 16 converts the input signal received from the video floppy disk reader 14 from an analog signal into an associated digital signal. The A/D converter 16 supplies an output on signal lines 104, namely, color-separated red, R, green, G, and blue, B signals are inputted to frame memories 18R, 18G, and 18B, respectively. The frame memories 18R, 18G, and 18B are disposed to store the video signals received from the A/D converter 16 which signals are in turn used for a printing operation. For example, a field of video signals read out from a track of the video floppy disk 12 are respectively stored in the frame memories 18R, 18G, and 18B and are then sequentially read out therefrom. Then image processing is achieved on the signals in an image processing section 20 and a printing operation is effected thereon in a recording section. The provision to store signals for the printing operation in the frame memories 18R, 18G, and 18B enables the video floppy disk reader 14 to start an operation to read the next video signal to be subjected to the printing operation.

The frame memories 18R, 18G, and 18B deliver outputs on signal lines 106 to the image processor 20, which in turn carries out a color processing and a gradation correction for the video signals received from the frame memories 18R, 18G, and 18B. That is, the color-separated red, green, and blue signals R, G, and B are converted into signals to be supplied to the monochromatic CRT 26 so as to develop color components of cyan, C; magenta, M; and yellow, Y on the sheet 34 of color printing paper. In addition, since an image represented by input video signals may be subjected to differing densities of each color from an actual object scene dependent on an illumination condition, a camera used to shoot the object, and the like, the image processor 20 effects a correction to compensate for the difference.

Outputs from the image processor 20 are delivered on signal lines 108 so as to be alternatively selected by a switch 22, and the obtained signal is fed on a signal line 110 to a digital-to-analog, D/A converter 24. The D/A converter in turn converts the input signal received from the switch 22 into an associated analog signal, which is then outputted on a signal line 112 to the recording monochromatic CRT 26 with high brightness. The CRT 26 sequentially visualizes on a screen thereof one of the images represented by the red, green, and blue signals, R, G, and B respectively which is selected by the switch 22 and received through the D/A converter 24. In front of the screen of the monochromatic CRT 26, there are disposed a lens 28, a three-color separating filter 30, a shutter 32, and a sheet 34 of color printing paper. In addition, the mechanical mask 60, which will be described later, is closely fixed on the sheet 34 of color printing paper.

On the screen of the monochromatic CRT 26, images associated with the respective red, green, and blue signals R, G, and B are sequentially displayed. The three-color separating filter 30 includes three plates of filters for the red, R, blue, B, and green, G, and the insertion of the filter plates into the optical path of lens 28 is controlled in response to a control signal received on a control line 128 from the controller 40 such that when an image associated with the respectively red, green and blue signals is displayed on the screen of the monochromatic CRT 26, there is selected the red, green or blue filter, respectively in response to the display operation. Like the three-color separating filter 30, the shutter 32 is also controlled by a control signal received over the signal line 128 from the controller 40. In time with the operations of the three-color separating filter 30 and the shutter 32, images associated with the respective red, green, and blue signals are sequentially projected onto a sheet 34 of color printing paper for an exposure of the sheet 34, thereby producing a color picture on the sheet 34 of color printing paper. The sheet 34 of color printing paper onto which the images have been projected is then delivered to a developer section, not shown in the figures, to develop the latent image.

The controller 40 is adapted to control operations of the functional sections of this apparatus and is advantageously constituted with a processing system such as a micro-processor. The controller 40 is connected to the frame memories 18R, 18G, and 18B so as to control operations thereof.

In addition, the controller 40 is connected to the program memory 42 in which program sequences of instructions for the controller 40 are stored. The controller 40 is further linked with an input device 46 such as a keyboard for an operator to input instructions for an image to be printed out, instructions for conditions associated with the image processing of the image to be printed out, and the like.

In FIG. 1, there is shown a state in which an image displayed on the CRT 26 is projected on the sheet 34 of color printing paper. As shown in this figure, the mechanical mask 60 is closely fixed on the sheet 34 of color printing paper. The mechanical mask 60 includes, as can be seen in the upper-right corner of FIG. 1, an outer periphery 60b larger than the sheet 34 of color printing paper and an opening section 60c having an inner periphery 60a as a contour associated with the image. The opening section 60c is disposed such that the outer periphery 60b is located in the neighborhood of the inner periphery 60a with respect to a side thereof, namely, such that in the case where an image is displayed on the sheet 34 of color printing paper and characters are displayed in the proximity of a side of the image or picture, lights are interrupted in the edge portions of three sides of the image other than the pertinent side thereof in which the characters are displayed.

In operation, the operator first loads the video floppy disk 12 in the video floppy disk reader 14 and then inputs from the input operator device 46 a track number associated with an image to be printed. Data of the track number of the printing image thus inputted from the input device 46 is sent by the controller 40 to the video floppy disk player 14, which in turn senses a video signal from the specified track of the video floppy disk 12 and delivers the video signal on the signal lines 102 to the A/D converter 16.

The video signals supplied from the video floppy disk reader 14 to the A/D converter 16 undergoe an A/D conversion therein, and the resultant signals including the red, R; green, G; and blue, B component signals are supplied to and are stored in the frame memories 18R, 18G, and 18B, respectively. The controller 40 further transmits a signal which represents predetermined characters and which is read out from the program memory 42 on a signal line 118 to the frame memories 18R, 18G, and 18B. The predetermined characters are, for example, letters displayed in the upper-left corner of the printed picture 34a of FIG. 1, and will be recorded on all the sheets 34 of color printing paper printed by the image recording apparatus. Incidentally, the controller 40 may be adapted to receive on a signal line 116 a differential phase shift keying, DPSK signal read out from the track of the video floppy disk 12, from which the video floppy disk reader 14 has read out the video signal, such that based on data contained in the DPSK signal, the controller 40 supplies the frame memories 18R, 18G, and 18B on the signal line 118 with a signal representing letters of a shooting date or a signal designating the number of the track on which the video signal is recorded. In the case where the controller 40 is adapted as described above, the shooting date or the track number is recorded for each printed item 34a. In addition, together with the track number, the identification of a frame image or a field image may also be recorded.

The video signals stored in the frame memories 18R, 18G, and 18B are read out therefrom in response to a control signal transmitted on a control line 134 from the controller 40, and are then fed over the signal lines 106 to the image processing section or image processor 20, which in turn accomplishes the color processing and the gradation correction on the received signals. The image processor 20 carries out the gradation correction when a control signal is received on a signal line 130 from the controller 40. The video signals which have undergone the gradation correction in the image processor 20 are displayed on a video monitor 50, which will be described later. If the operator desires to further conduct a correction through a visual check of the image displayed on the video monitor 50, then the operator may input data for the correction from the input device 46. The data supplied from the operator is sent over the controller 40 to the image processor 20, which then effects another gradation correction on the video signals based on data.

The video signals on which the image processing such as the gradation correction has been achieved in the image processor 20 are delivered on the signal lines 108 to the switch 22, which in turn alternatively selects the red, R; green, G; and blue, B components and outputs the selected signal over the signal line 110 to the D/A converter 24. The signal supplied to the D/A converter 24 is then converted into an analog signal to be fed on the signal line 112 to the monochromatic CRT 26. In addition, the signals outputted from the image processor 20 are delivered over the signal line 108 to the D/A converter 24 to be converted into an analog signal therein, and the obtained signal is supplied to the video monitor 50.

In a manner similar to that which is displayed on the CRT 26 of FIG. 1, there are displayed on the video monitor 50 an image 70 and characters 72 which have undergone the image processing. Incidentally, the video signals outputted from the image processor 20 and which have undergone a negative-to-positive inversion may also be subjected further to a negative-to-positive inversion by use of a negative-to-positive inverter means, not shown in this figure, so as to supply the resultant signals to the video monitor 50. Alternatively, the video signals from the image processor 20 may be supplied to the video monitor 50 without effecting the negative-to-positive inversion thereon. In the latter case, an original color picture without the negative-to-positive inversion is displayed on the video monitor 50.

The operator confirms whether or not the color image 70 displayed on the video monitor 50 is the specified image and whether or not the characters thus displayed are those to be printed out; furthermore, whether or not the image processing such as the gradation correction has been appropriately conducted in the image processor 20. If the image processing is insufficient, the operator may set an appropriate image processing parameter to achieve a gradation correction and the like on the image displayed on the video monitor 50 and input the data from the input operation panel 46, and thereafter adjust the parameter setup condition. These data items are delivered via the controller 40 to the image processor 20, which in turn accomplishes the image processing such as the gradation correction according to the data established by the operator.

After confirming that the appropriate gradation is attained for the video image displayed on the video monitor 50, the operator supplies an instruction for a start of the printing operation from the input operation panel 46. When the instruction for the start of the printout, the controller 40 sends a control signal for the printing operation over the control line 128 to the three-color separating filter 30 and the shutter 32 depending on data separately inputted from the input operation panel 46 to specify the number of copies to be printed out. In the CRT 26, the three-color separated component signals R, G, and B which are associated with the video signal selected by the switch 22 after the gradation correction and the signals representing the characters are sequentially delivered from the D/A converter 24 and images represented by those signals are in turn displayed on the screen of the CRT 26. As a result, pictures 70 and characters are displayed on the screen of CRT 26 as shown in FIG. 1.

The three-color separator filter 30 is sequentially set and timed with the selection of the switch 22 according to the control signal transmitted from the controller 40. Similarly, the shutter 32 is opened or closed in response to a control signal from the controller 40 such that images represented by the three-color separated component signals R, G, and B and displayed on the monochromatic CRT 26 are sequentially projected onto the sheet 34 of color printing paper. As shown in FIG. 1, the mechanical mask 60 has the opening section 60c having the internal periphery 60a as the contour thereof, and since the opening section 60c is arranged in association with an area 72a where the characters are to be projected in addition to an area 70a for the projection of the image, the image and the characters are projected onto the sheet 34 of color printing paper. In consequence, both of the image 70 and the characters 72 displayed on the CRT 26 are projected so as to attain a printed picture 34a which includes the image and the characters.

In addition, as shown in FIG. 1, since the internal periphery 60a of the opening section 60c is formed such that three sides thereof are placed inward from the corresponding sides of the area 70a where the image is projected onto the sheet 34 of color printing paper, light is interrupted in the edge portions on the three sides of the area 70a of the image projected onto the sheet 34 and hence the edge portions on the three sides are cut out. As a result, even when there exists a variation in the position of the image 70 displayed on the CRT 26, three sides of the image projected onto the sheet 34 of color printing paper can be located at fixed positions. In addition, even where there occurs the spool-shaped or barrel-shaped distortion in the contour of the image displayed on the CRT 26, the distortion does not take place in the three sides of the printed item 34a on the sheet 34 of the color printing paper. On the other hand, for the area 72 onto which the characters are projected, since the opening section 60c is formed not to interrupt the lights, the characters are not cut out and an appropriate exposure of the sheet 34a is effected for the characters.

As described above, the sheet 34 of color printing paper on which the color image has been projected is delivered to the developer section so as to be subjected to image development, thereby attaining a visualized color image in printed form.

In order to clarify the characteristics of the printed item according to the present invention to a further extent, a comparison thereof with a conventional example will be described.

Figure 3:
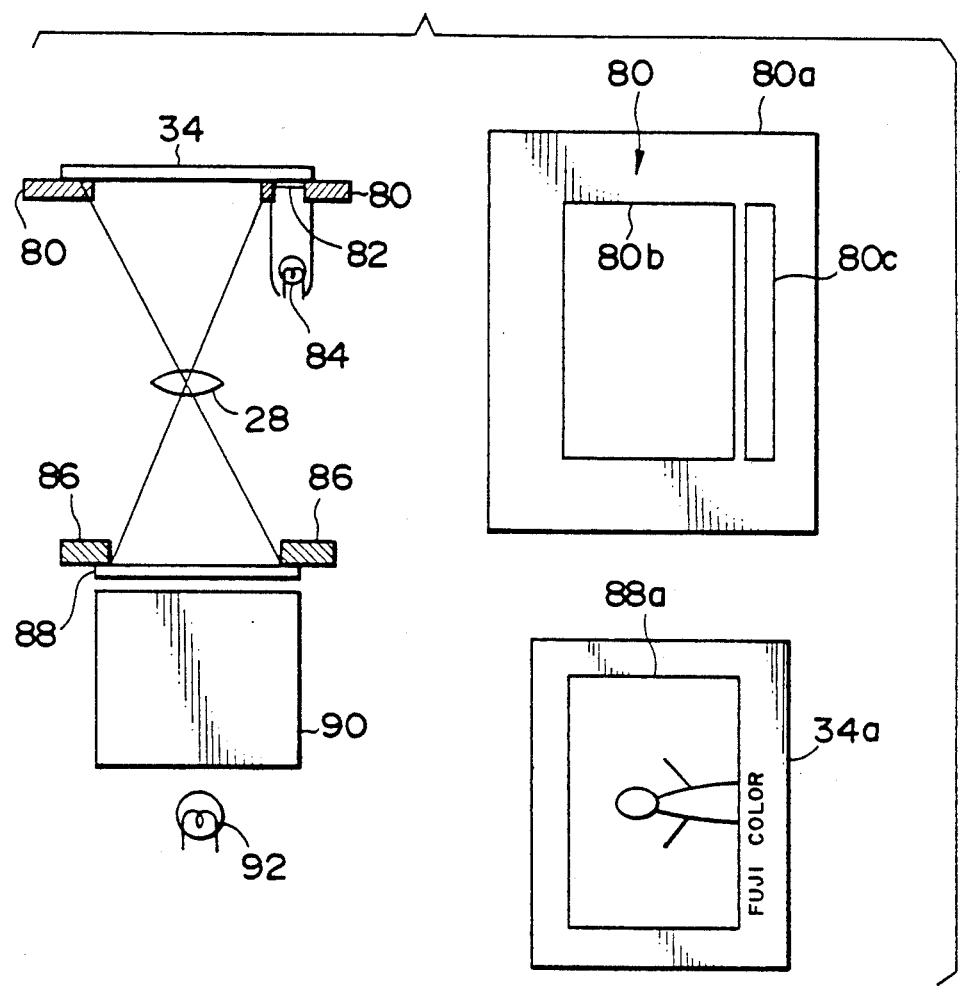

In FIG. 3, there is shown an example of the conventional image recording apparatus including a projector, a mask, and a printed image. In this apparatus, an image developed in a negative film 88 is projected onto a sheet 34 of color printing paper to attain a printed image 34a. A negative mask 86 is closely arranged on the negative film 88 such that the negative film 88 undergoes an exposure through a mirror box 90 by use of a halogen lamp 92 disposed on the rear side of the negative film 88.

A print mask 80 is closely disposed on the sheet 34 of color printing paper. The print mask 80 has an outer periphery 80a, an opening 80b for a projection of an image, and an opening 80c for a projection of characters. For edge portions on the respective sides of the image of the negative film 88 projected through the opening 80b, the lights are interrupted by means of the print mask 80. In addition, a lithographic film 82 on which characters are carried is located in the opening 80c of the print mask 80. The characters carried on the lithographic film 82 are projected by use of the halogen lamp 84 through the opening 80c of the print mask 80 for an exposure thereof.

In the case where the image and the characters are recorded on the sheet 34 of color printing paper as described above, the exposure for the image is conducted through the opening 80b, and in the edge portions of the image, the lights are interrupted by use of the print mask 80; consequently, there does not appear a variation in the position of the obtained image. In addition, the exposure of the characters are also achieved through the opening 80c of the print mask 80 so as to be recorded on the sheet 34. However, since the characters are printed out by use of the lithographic film 82, only the predetermined characters carried on the lithographic film 82 can be recorded in this apparatus, and hence, for example, it is impossible to record a different date for each printed picture.

In contrast thereto, according to the embodiment of the present invention, depending on the signals sent from the controller 40 to the frame memories 18R, 18G, and 18B, a signal representing characters is delivered to the CRT 26 so as to display the characters 72 on the CRT 26, and the characters 72 are then projected onto the sheet 34 of color printing paper; consequently, various types of characters can be recorded on the sheet 34 of color printing paper.

Figure 4:
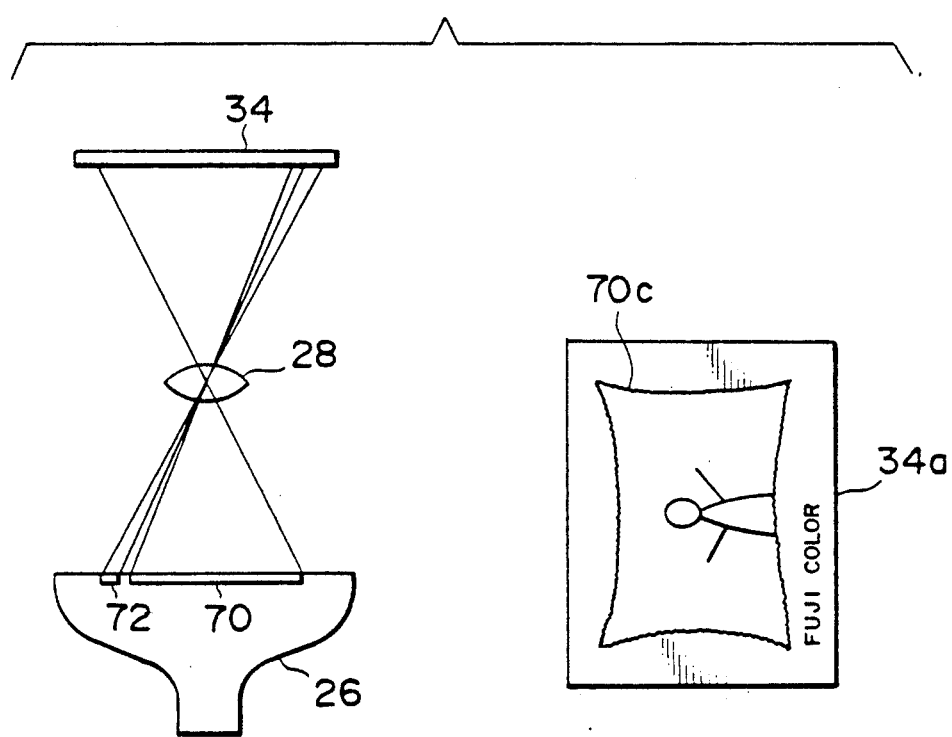
FIG. 4 schematically shows a portion of another conventional image recording apparatus and a printed example obtained by the recording apparatus.

In FIG. 4, there is shown another example of a projector section of the conventional image recording apparatus together with an image printed by the apparatus. This apparatus does not include a mechanical mask, namely, an image 70 and characters 72 displayed on a CRT 26 are directly projected onto a sheet 34 of color printing paper so as to attain a printed image thereof.

According to the apparatus above, it is possible to print out the image and the characters, and since characters displayed on the CRT 26 are projected onto the sheet 34 of color printing paper, various kinds of characters can be recorded on the sheet 34. In this apparatus, however, since the mask is not employed, there appears a distortion in the contour of an image 70c attained in a printed picture 34a as shown in an emphasized fashion in FIG. 4. In other words, the contour lines of the image 70c are not arranged in parallel with those of a sheet 34a of color printing paper and as a result, printed picture quality suffers. In addition, the position of the image recorded on the printed picture 34a is not fixed.

According to the embodiment of the present invention, since the edge portions on the three sides of the image from the CRT 26 to be subjected to an exposure are cut out, the distortion of the contour can be removed from the portions of the printed image on the three sides thus cut out; furthermore, the variation in the image position can be prevented. Consequently, the distortion of the contour of the image displayed on the CRT 26 need only be adjusted for one side adjacent to the characters, which therefore facilitates the adjustment.

As described above, according to the embodiment of the present invention, together with the image read out from the video floppy disk 12, the characters associated with the data read out from the video floppy disk 12 or the predetermined characters read out from the program memory are displayed on the CRT 26 so as to be printed out on the sheet 34 of color printing paper. Since the mechanical mask 60 closely disposed on the sheet 34 of color printing paper has an opening also in a portion onto which the characters are projected, various kinds of characters can be printed out together with the image according to the apparatus. In addition, since the contour of the image is cut out, the variation in the position of the image thus recorded is removed and the occurrence of the distortion in the contour of the recorded image can be prevented.

Incidentally, in the embodiment above, although a description has been given of the case where characters or letters are displayed together with an image, the present invention is applicable also to the case where information items such as graphic symbols are displayed in place of the characters. Furthermore, in the embodiment above, an apparatus for reading video signals from the video floppy disk 12 so as to produce a color printout picture has been described; however, the present invention can also be applied to an apparatus in which a printout image is produced by reading out video signals recorded on a video signal recording medium other than the video floppy disk, for example, a video tape, a video disk such as an optical disk or a laser disk, or an IC memory card.

According to the present invention, various kinds of characters can be recorded on an image recording medium together with an image represented by video signals read out from a video signal recording medium. In addition, since lights are interrupted in the edge portions of the projected image by use of light interrupting means, the position of the recorded image can be fixed and hence a printed image can be attained without a distortion in the contour of the image.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. An image recording apparatus for projecting an image onto a rectangular image recording medium so as to record the image in an ultimately visualized form on the rectangular image recording medium, comprising:
   video display means for displaying both information and an image represented by video signals read out from a video signal recording medium;
   projecting means for projecting said image and said information displayed on said video display means onto said rectangular image recording medium; and
   shading means disposed in front of said rectangular image recording medium and surrounding only three sides of said image, so that said information is projected on a side of said rectangular image recording medium corresponding to a fourth unsurrounded side of said image, light incident on said shading means is shaded to provide a smooth contour on said three sides of said recorded image.

2. The image recording apparatus in accordance with claim 1, said shading means shades light in the neighborhood of one outer side within the confines of an additional area of said rectangular image recording medium onto which said information is projected, said one outer side being apart from the area onto which said image is projected.

3. The image recording apparatus in accordance with claim 1, said information includes data associated with said video signals read out form said video signal recording medium.

4. The image recording apparatus in accordance with claim 1, said shading means comprises a mask located in physical contact with said image recording medium.

5. The image recording apparatus in accordance with claim 1 said rectangular image recording medium is a sheet of printing paper.

6. An image recording apparatus comprising:
   video display means for displaying an image, input from a video signal recording medium as video image signals, and information;
   an image recording medium for recording said image and said information displayed on said video display means;
   projection means for projecting said image and said information onto said image recording medium; and
   mask means, disposed in physical contact in front of said image recording means and surrounding only three sides of said image so that said information is projected on a side of said image recording medium corresponding to a fourth unsurrounded side of said image, for interrupting light from a portion of said video display means to provide a smooth contour on said three sides of said recorded image.

7. The image recording apparatus in accordance with claim 6, said video display means displays said image in an upper area with said information displayed in a lower area adjacent said upper area.

8. The image recording apparatus in accordance with claim 7, said information is indicative of a date in which said image was recorded on said video signal recording medium.

9. The image recording apparatus in accordance with claim 7, said information is indicative of a track number in which said image was recorded on said video signal recording medium.

10. The image recording apparatus in accordance with claim 6, wherein said mask means further interrupts light from an outer edge of said information displayed in said lower area located away from said image displayed in said upper area.

11. The image recording apparatus in accordance with claim 6, said image recording medium is printing paper.

12. An image recording apparatus comprising:
video display means for displaying an image, input from a video signal recording medium as video image signals, and information;
an image recording medium for recording said image and said information displayed on said video display means;
projection means for projecting said image and said information onto said image recording medium; and
mask means for interrupting light from a portion of said video display means, said image located at an upper portion o said video display means and said information located at a lower portion of said video display means, said mask means disposed in front of said image recording medium, surrounding only three sides of said image, so that said information is projected on a side of said image recording medium corresponding to a fourth unsurrounded side of said image.

13. The image recording apparatus in accordance with claim 12, said mask means is in physical contact with said image recording medium.

14. The image recording apparatus in accordance with claim 13, said image recording medium is printing paper.

15. The image recording apparatus in accordance with claim 14, said information is indicative of a track number in which said image was recorded on said video signal recording medium.

16. The image recording apparatus in accordance with claim 14, said information is indicative of a date on which said image was recorded on said video signal recording medium.

17. A method of image recording comprising the steps of:
displaying in an upper portion of a video display means an image input as video image signals from a video signal recording medium;
displaying in a lower adjacent portion of said video display means information input from a control means;
projecting said image and said information displayed on said video display mean via projection means onto an image recording medium; and
masking light from said video display means with a masking means to interrupt light corresponding to three outer edges of said image displayed in said upper portion of said video display means located away from said information and light corresponding to an outer edge of said information displayed in said lower adjacent portion of said video display means located away from said image.

18. The method of image recording in accordance with claim 17 further comprising the step of placing said mask means in physical contact with said image recording medium.

19. The method of image recording in accordance with claim 18 further comprising the step of displaying a date in which said image was recorded on said video signal recording medium as said information.

20. The method of image recording in accordance with claim 18 further comprising the step of displaying a track number of which said image is recorded on said video signal recording medium as said information.

21. The method of image recording in accordance with claim 18 wherein said image recording medium is printing paper.

* * * * *